(12) United States Patent
Kikuchi et al.

(10) Patent No.: US 7,916,250 B2
(45) Date of Patent: Mar. 29, 2011

(54) LIQUID CRYSTAL DISPLAY DEVICE

(75) Inventors: Katsuhiro Kikuchi, Matsusaka (JP); Masumi Kubo, Ikoma (JP); Takayuki Natsume, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 336 days.

(21) Appl. No.: 12/093,005

(22) PCT Filed: Nov. 9, 2006

(86) PCT No.: PCT/JP2006/322357
§ 371 (c)(1),
(2), (4) Date: May 8, 2008

(87) PCT Pub. No.: WO2007/055269
PCT Pub. Date: May 18, 2007

(65) Prior Publication Data
US 2009/0180068 A1    Jul. 16, 2009

(30) Foreign Application Priority Data
Nov. 10, 2005   (JP) .................... 2005-326538

(51) Int. Cl.
*G02F 1/1335*    (2006.01)
(52) U.S. Cl. ............ 349/117; 349/11; 349/12; 349/137
(58) Field of Classification Search .............. 349/11, 349/12, 117, 137
See application file for complete search history.

(56) References Cited

FOREIGN PATENT DOCUMENTS

| | | | |
|---|---|---|---|
| JP | 06-24812 Y2 | | 6/1994 |
| JP | 11133410 A | * | 5/1999 |
| JP | 2000-039611 A | | 2/2000 |
| JP | 2000039611 A | * | 2/2000 |
| JP | 2003-005662 A | | 1/2003 |
| WO | 00/70550 A1 | | 11/2000 |

OTHER PUBLICATIONS

Official communication issued in the International Application No. PCT/JP2006/322357, mailed on Jan. 23, 2007.

* cited by examiner

*Primary Examiner* — Uyen-Chau N Le
*Assistant Examiner* — Chris H Chu
(74) *Attorney, Agent, or Firm* — Keating & Bennett, LLP

(57) ABSTRACT

A liquid crystal display device includes a liquid crystal module and a touch panel section arranged in front of the liquid crystal module. There is a space between the liquid crystal module and the touch panel section, and a layer of air is present in the space. The liquid crystal module has a λ/4 plate on the front side. The touch panel section includes a polarization plate and λ/4 plate which are arranged on the front side of a touch panel in this order.

3 Claims, 1 Drawing Sheet

LIQUID CRYSTAL DISPLAY DEVICE

BACKGROUND OF THE INVENTION

1. Field of the Invention

The present invention relates to liquid crystal display devices, in particular, to a liquid crystal display device including separate functional members, such as a touch panel, provided in front of a liquid crystal module.

2. Description of the Related Art

There has been widely used a recent liquid crystal display device as a display section in variety of products. Therefore, a separate functional member such as a touch panel is sometimes provided on the front surface side of a liquid crystal module (display surface) in a liquid crystal display device. Alternatively, a transparent protection plate is sometimes provided on the front surface side of a liquid crystal module (display surface) as a functional member to protect a polarization plate in the liquid crystal module and/or to protect a glass substrate from damage caused by externally applied impacts.

A functional member such as a touch panel or a protection plate is arranged so that a space is left between a functional plate and a liquid crystal module. There is a layer of air in the space between the liquid crystal module and the functional member. The layer of air causes externally entered light to be reflected from an interface between the layer of air and the back surface of the functional member or to be reflected from an interface between the layer of air and the front surface of the liquid crystal module. This leads to a problem that the display contents in the liquid crystal module are difficult to view.

Japanese Examined Utility Model (Registration) Application Publication No. 06-24812 discloses an arrangement that prevents the reflection problem caused by a liquid crystal display device in which a transparent protection plate is provided in front of a liquid crystal module. The following description deals with an arrangement of a liquid crystal display device disclosed in the Japanese Examined Utility Model (Registration) Application Publication No. 06-24812 with reference to FIG. 2.

In the liquid crystal display device illustrated in FIG. 2, a protection panel 110 including a protection plate 111 is provided in front of a liquid crystal module 100. There is a space left between the liquid crystal module 100 and the protection panel 110, and a layer of air is secured in the space.

For the protection panel 100, an anti-reflection film 112 is provided on the front surface side of the protection plate 111, and a polarization plate 113 and a λ/4 plate 114 are provided on the back surface side of the protection plate 111 in the order of being the closer side to the protection plate 111.

In the liquid crystal module 100, a liquid crystal layer is sandwiched between two transparent substrates, and an alignment film is provided on a surface of each of the substrates with which surface the liquid crystal layer makes contact. In FIG. 2, the liquid crystal module 100 is illustrated in a simplified manner. Namely, the transparent substrates, the alignment films, and the liquid crystal layer are not illustrated in FIG. 2. A λ/4 plate 101 is provided on the front surface side of the liquid crystal module 100, and a polarization plate 102 is provided on the back surface side of the liquid crystal module 100.

The anti-reflection film 112 prevents light that has externally entered from the front surface side of the liquid crystal display device from being reflected from the front surface of a protection plate 101.

The polarization plate 113 and the λ/4 plate 114 avoid that the light externally entered from the front surface side of the liquid crystal display device is reflected from an interface between the back surface of the protection panel 110 and the layer of air, or from an interface between the front surface of the liquid crystal module 100 and the layer of air. This makes it possible to prevent the reflection from being viewed by a viewer. In the liquid crystal display device illustrated in FIG. 2, one of the polarization plates used for display control (the polarization plate provided on the front surface side of the liquid crystal layer) is provided on the front surface side of the layer of air (i.e., on the side of the protection panel 100), and the one of the polarization plates is combined with a λ/4 plate. This combination realizes a circularly polarized light means. With this arrangement, the light externally entered from the front surface side of the liquid crystal display device becomes linear polarized light while first passing though the polarization plate 113. The linearly polarized light is reflected from the interface between the back surface of the protection panel 110 and the layer of air or is reflected from the interface between the front surface of the liquid crystal module 100 and the layer of air. Then, the reflected light passes through the λ/4 plate 114 twice before reaching the polarization plate 113, thereby resulting in its plane of polarization being rotated by 90°. This causes the reflected light to be blocked by the polarization plate 133.

In addition, the λ/4 plate 101 on the side of the liquid crystal module 100 is provided to aid the display control (tone control) function of the polarization plate 113. In the arrangement illustrated in FIG. 2, the polarization plate 113 is the one of the two polarization plates for display control, which polarization plate is provided on the side of the protection panel 110. In order for the polarization plate 113 to carry out a display control function, the outgoing display light from the liquid crystal module 100 should be linearly polarized light during passing through the polarization plate 113. Without the λ/4 plate 101, however, outgoing display light from the liquid crystal module 100 is linearly polarized light after it passes through the polarization plate 102. But the linearly polarized light is converted into circularly polarized light while passing through the λ/4 plate 114, thereby resulting in that the circularly polarized light enters into the polarization plate 113.

On the contrary, with the λ/4 plate 101, the outgoing display light from the liquid crystal module 100 is converted into circularly polarized light while passing through the λ/4 plate 101 and is then converted into linearly polarized light by the λ/4 plate 114. As a result, the linearly polarized display light thus converted is entered into the polarization plate 113 from the liquid crystal module 100. This allows the polarization plate 113 to have a display control function.

As a conventional example that prevents externally entered light from being reflected, Japanese Unexamined Patent Application Publication No. 2000-321558 discloses a liquid crystal display device that has a touch panel in front of a liquid crystal module. The following description deals with an arrangement of the liquid crystal display device disclosed in the Japanese Unexamined Patent Application Publication No. 2000-321558 with reference to FIG. 3.

In the liquid crystal display device illustrated in FIG. 3, a touch panel section 130 including a touch panel 131 is provided in front of a liquid crystal module 120. FIG. 3 does not illustrate the details of the touch panel 131 (members such as substrates and electrodes). There is a space left between the liquid crystal module 120 and the touch panel section 130, so that a layer of air is present in the space.

In the touch panel section 130, a polarization plate 132 and a λ/4 plate 133 are provided in this order, i.e., in the order of being closer to the front surface of the touch panel section 130. An anti-reflection film 135 and a λ/4 plate 134 are provided in this order, i.e., in the order of being closer to the back surface of the touch panel section 130.

In the liquid crystal module 120, a liquid crystal layer is sandwiched between two transparent substrates, and an alignment film is provided on a surface of each of the substrates with which surface the liquid crystal layer makes contact. In FIG. 3, the liquid crystal module 120 is illustrated in a simplified manner. Namely, the transparent substrates, the alignment films, and the liquid crystal layer are not illustrated in FIG. 3. A polarization plate 121 is provided on the front surface side of the liquid crystal module 120, and a polarization plate 122 is provided on the back surface side of the liquid crystal module 120.

The polarization plate 132 and the λ/4 plate 133 in the touch panel section 130 prevents external light that has entered from the front surface side of the liquid crystal display device from being reflected from the inside of the touch panel 131. As compared to a mere protection plate, the light tends to be reflected from the inside of the touch panel 131 because the touch panel 131 includes electrodes and the layer of air. Therefore, the polarization plate 132 and the λ/4 plate 133, which have stronger anti-reflective capability than a mere anti-reflection film, are provided on the front surface side of the touch panel section 130.

Accordingly, the reflected light occurring inside the touch panel 131 passes through the λ/4 plate 133 twice for a time period from the time when the reflected light first passes through the polarization plate 132 to the time when the reflected light is reflected from the inside of the touch panel 131 so as to reach the polarization plate 132. This causes the reflected light to be blocked off by the polarization plate 132.

Also, the λ/4 plate 134 in the touch panel section 130 is provided so that almost all the display light from the liquid crystal module 120 can transmit the polarization plate 132. An anti-reflection film 135 in the touch panel section 130 is arranged to prevent external light that has entered from being reflected from an interface between the back surface of the touch panel section 130 and the layer of air.

Unfortunately, however, the liquid crystal display device in the Japanese Examined Utility Model (Registration) Application Publication No. 06-24812 has a problem of decline in visual characteristics. In the arrangement illustrated in FIG. 2, the polarization plate 113 for display control is provided on the side of the protection panel 110. The two λ/4 plates 114 and 101 are provided between the polarization plate 113 and the liquid crystal module 100. In this case, the visual characteristics of the liquid crystal display device including the liquid crystal module 100 and the protection panel 110 are also affected by the visual characteristics of the λ/4 plates 114 and 101. As a result, the visual characteristics (the contrast viewed from an oblique angle in particular) of liquid crystal display device are declined.

However, the liquid crystal display device in the Japanese Unexamined Patent Application Publication No. 2000-321558 includes two polarization plates 121 and 122 for display control in the liquid crystal module 120, thereby preventing the decline in the visual characteristics. This is because the visual characteristics of liquid crystal display device are not affected by the visual characteristic of the λ/4 plate.

In the arrangement of the liquid crystal display device disclosed in the Japanese Unexamined Patent Application Publication No. 2000-321558, the polarization plate 132 and the λ/4 plate 133 are provided for anti-reflection of externally entered light. Without the additional arrangement of the λ/4 plate 134, however, the polarization plate 132 absorbs the display light, thereby causing a decline in the display brightness.

According to the arrangement of FIG. 3, in the liquid crystal module 120, the display light is linearly polarized light that has been subjected to a display control when the display light passes through the polarization plate 121. The following description deals with a case where the touch panel section 130 does not have a λ/4 plate 134.

In order for the polarization plate 132 and the λ/4 plate 133 to have an anti-reflective function, the angle between a lag axis of the λ/4 plate 133 and an absorption axis of the polarization plate 132 is set to 45°. When the angle between a transmission axis of the polarization plate 121 in the liquid crystal module 120 and the lag axis of the λ/4 plate 133 is 45°, the display light from the liquid crystal module 120 becomes circularly polarized light while passing through the λ/4 plate 133. This causes about half amount of the display light to be further blocked off while passing through the polarization plate 132.

When the transmission axis of the polarization plate 121 and the lag axis of the λ/4 plate 133 are parallel (or orthogonal) to each other, the display light from the liquid crystal module 120 does not change its polarization state during passing through the λ/4 plate 133. In this case, however, the display light enters into the polarization plate 132 as the linearly polarized light which inclines at an angle of 45° with respect to the absorption axis of the polarization plate 132. In this case, about half of the display light is blocked off by the polarization plate 132, too.

On the contrary, in the arrangement having the λ/4 plate 134, when the outgoing display light from the liquid crystal module 120 passes through the λ/4 plate 134, the outgoing display light is converted from linearly polarized light to circularly polarized light. When the display light thus converted passes through the λ/4 plate 133, the display light is further converted from circularly polarized light to linearly polarized light. Furthermore, the linearly polarized light is entered into the polarization plate 132 as the linearly polarized light which travels in parallel to the transmission axis of the polarization plate 132. This avoids a situation in which the polarization plate 132 absorbs the display light.

In case of an arrangement in which the λ/4 plate 133 and the λ/4 plate 134 are provided, however, the problem caused this time is, without an anti-reflection film 135, it is not possible to avoid the reflection from an interface between the touch panel section 130 and the layer of air.

Namely, in cases where the λ/4 plate 133 and the λ/4 plate 134 are provided in the touch panel section 130, externally entered light, reflected from an interface between the touch panel section 130 and the layer of air, (i) first passes through the polarization plate 132, (ii) passes through the λ/4 plate 133 and 134, respectively twice, and then (iii) reaches again the polarization plate 132. This causes the externally entered light to have a plane of polarization rotated by 180° and then to reach the polarization plate 132, after the externally entered light passes through the polarization plate 132. As a result, the externally entered light thus reached (the reflected light) can not be blocked by the polarization plate 132.

Therefore, the liquid crystal display device illustrated in FIG. 3 requires the anti-reflection film 135 to block the reflection from the interface between the touch panel section 130 and the layer of air. This makes the process steps complicated and increases the cost, which problems are derived from manufacturing of the anti-reflection film 135.

Moreover, in order to avoid the reflection from an interface between the liquid crystal module 120 and the layer of air, it is in fact necessary to further provide an anti-reflection film on the front surface side of the liquid crystal module 120. This is not explicitly described in Japanese Unexamined Patent Application Publication No. 2000-321558 but causes further problems of making the steps complicated and increasing the cost.

SUMMARY OF THE INVENTION

In view of the foregoing problems, preferred embodiments of the present invention provide a liquid crystal display device in which all of the externally entered light can be reflected with a simple structure without deterioration in the visual characteristics.

A liquid crystal display device according to a preferred embodiment of the present invention includes a liquid crystal module and a functional member provided in front of the liquid crystal module are arranged so that a space is left therebetween. One of the unique features of the liquid crystal display device according to a preferred embodiment of the present invention resides in that (i) a λ/4 plate is provided in front of the liquid crystal module and (ii) a polarization plate and a λ/4 plate are provided in front of the functional member in this order from the front surface side.

According to this arrangement, since the polarization plate and the λ/4 plate are provided on the side of the functional member, it is possible to block not only the externally entered light reflected from inside of the functional member but also the externally entered light reflected from an interface between (i) the functional member or the liquid crystal module and (ii) the layer of air. Therefore, it is not necessary that the anti-reflection film be provided on the back surface side of the functional member and/or on the front surface side of the liquid crystal module. As a result, the problems of making the steps complicated and increasing the cost, which problems are derived from manufacturing of the anti-reflection film(s), are avoided.

Also, according to this unique arrangement, since a combination of the polarization plate and the λ/4 plate, each of which has a stronger anti-reflective capability than an anti-reflection film, is used, it is also possible with higher effectiveness to prevent the external light that has entered from being reflected from the interface between (i) the functional member or the liquid crystal module and (ii) the layer of air.

Further, the λ/4 plate provided in front of the liquid crystal module reduces the loss of the display light passing through the polarization plate provided on the side of the functional member.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
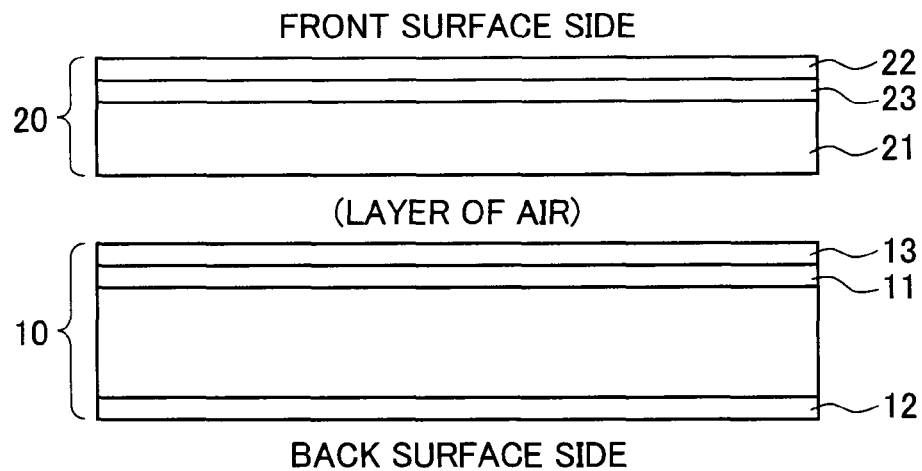
FIG. 1 is a cross-section view illustrating a principal structure of a liquid crystal display device in accordance with a preferred embodiment of the present invention.

The following description deals with a preferred embodiment of the present invention with reference to FIG. 1. First of all, a schematic structure of a liquid crystal display device in accordance with a preferred embodiment of the present invention is explained with reference to FIG. 1.

A liquid crystal display device illustrated in FIG. 1 includes a liquid crystal module 10, and a touch panel section 20, serving as a functional member, provided in front of the liquid crystal module. There is a space left between the liquid crystal module 10 and the touch panel section 20, in which space a layer of air is secured.

The liquid crystal module 10 is arranged so that a liquid crystal layer is sandwiched between two transparent substrates. In each of the transparent substrates, an alignment film is provided on a side that makes contact with the liquid crystal layer. In FIG. 1, the liquid crystal module 10 is illustrated in a simplified manner. Namely, the transparent substrates, the alignment films, and the liquid crystal layer are not illustrated in the figure. The liquid crystal module 10 is arranged so that a polarization plate 11 is provided on the front surface side and a polarization plate 12 is provided on the back surface side and so that a λ/4 plate 13 is further provided on the front surface side of the polarization plate 11.

The touch panel section 20 includes a touch panel 21. A polarization plate 22 and a λ/4 plate 23 are provided on the front surface side of the touch panel 21 in this order, i.e., in the order of being closer to the front surface of the touch panel 21. Note that the detail of the touch panel 21 (members such as substrates and electrodes) is omitted in FIG. 1.

The following description deals with the relationship between the transmission axis of the polarization plate (or the absorption axis of the polarization plate) and the lag axis of the λ/4 plate in the liquid crystal display device. The angle between the absorption axis of the polarization plate 22 and the lag axis of the λ/4 plate 23 is preferably set to 45°. This makes each of the polarization plate 22 and the λ/4 plate 23 work as an anti-reflection member against externally entered light.

Also, it is preferable to set so that the relationship between the λ/4 plate 23 and the λ/4 plate 13, and the relationship between the polarization plate 22 and the polarization plate 11 satisfy any one of the following conditions A through C.

(A): As to the λ/4 plate 23 and the λ/4 plate 13, they preferably have a same retardation and their lag axes are perpendicular or substantially perpendicular to each other. As to the polarization plate 22 and the polarization plate 11, their transmission axes are parallel or substantially parallel to each other.

(B): As to the λ/4 plate 23 and the λ/4 plate 13, they preferably have a same retardation and their lag axes are in parallel to each other. As to the polarization plate 22 and the polarization plate 11, their transmission axes are perpendicular or substantially perpendicular to each other.

(C): In the condition (A) or (B), the lag axis of the λ/4 plate 13 and the transmission axis of the polarization plate 22 are rotated by a same degree in a same direction.

Under the condition A, B, or C, the loss of the display light at the polarization plate 22 is minimized. However, the angle of the transmission axis of the polarization plate 22 is likely to be determined by a countermeasure against polarized sunglasses. (Normally, the polarized sunglasses have an absorption axis in a horizontal direction. So, if the polarization plate 22 is set to have an absorption axis in a horizontal direction, then the person who is wearing polarized sunglasses cannot view a display screen.) Further, it is not always possible to fulfill the condition A, B, or C because the transmission axis of the polarization plate 11 is also determined by the characteristics of the liquid crystal module.

In this case, a solution is to provide a λ/2 plate between the polarization plate 11 and the λ/4 plate 13. When linearly polarized light enters into the λ/2 plate, for example, when the linearly polarized light enters into the λ/2 plate so that the incident angle of the linearly polarized inclines by an angle of α° with respect to the lag axis of the λ/2 plate, the outgoing polarized light from the λ/2 plate has an outgoing angle which inclines by an angle of −α° with respect to the lag axis. This means that, once the polarization plate 22, the λ/4 plate 23, and the λ/4 plate 13 are determined, an ideal angle of the polarization plate 11 to fulfill the condition A, B, or C is calculated. It is possible to obtain the same effect as the condition (A), (B) or (C), by providing the λ/2 plate so that the lag axis of the λ/2 plate inclines by β°/2, where β° indicates an angle between such an ideal angle and an actual angle of the polarization plate 11 provided on the side of the liquid crystal panel. The β°/2 falls within a range between the ideal angle and the transmission axis of the polarization plate 11. The same effects can be obtained by providing the λ/2 plate between the polarization plate 22 and the λ/4 plate 23 in accordance with the above rule. Even if a λ/2 plate is not able to be provided due to its cost, the light loss in the polarization plate 22 can be reduced to some extent, depending on how the retardation of the λ/4 plate 13 and the angle of the lag axis of the λ/4 plate 13 are set.

Next, the following description deals with how the externally entered light is avoided to be reflected in the liquid crystal display device of the present preferred embodiment. The polarization plate 22 and the λ/4 plate 23 in the touch panel section 20 prevent external light that has entered the front surface side of the liquid crystal display device (i) from being reflected from the inside of the touch panel 21 and (ii) from being reflected from an interface between (i) the liquid crystal module 10 or the touch panel 20 and (ii) the layer of air so as to be viewed by a viewer.

As compared with a mere protection panel, the light tends to be reflected from the inside of the touch panel 21 because the touch panel 21 includes in its inside electrodes and a layer of air. Therefore, the polarization plate 22 and the λ/4 plate 23, which have stronger anti-reflective capability than the mere anti-reflection film, are provided on the front surface side of the touch panel section 20.

Accordingly, the light reflected from the inside of the touch panel 21 passes through the λ/4 plate 23 twice for a period from the time when the light reflected from the inside of the touch panel 21 first passes through the polarization plate 22 to the time when it is reflected from the inside of the touch panel 21 so as to reach again the polarization plate 22. This allows the light thus reflected to be blocked off by the polarization plate 22. In like manner, the externally entered light reflected from the interface between (i) the touch panel section 20 or the liquid crystal module 10 and (ii) the layer of air is also blocked off by the polarization plate 22.

As explained above, in the liquid crystal display device in the present preferred embodiment, the polarization plate 22 and the λ/4 plate 23 in the touch panel section 20 can block not only the externally entered light reflected from the inside of the touch panel 21 but also the externally entered light reflected from the interface between (i) the touch panel section 20 or the liquid crystal module 10 and (ii) the layer of air. Unlike the conventional device illustrated in FIG. 3, it is not necessary that the anti-reflection film be provided on the back surface side of the functional member and/or on the front surface side of the liquid crystal module. As a result, the problems of making the steps complicated and increasing the cost, which problems are derived from manufacturing of the anti-reflection film(s), are eliminated.

Next, the display light in the liquid crystal display device of the present preferred embodiment is explained.

Figure 2:
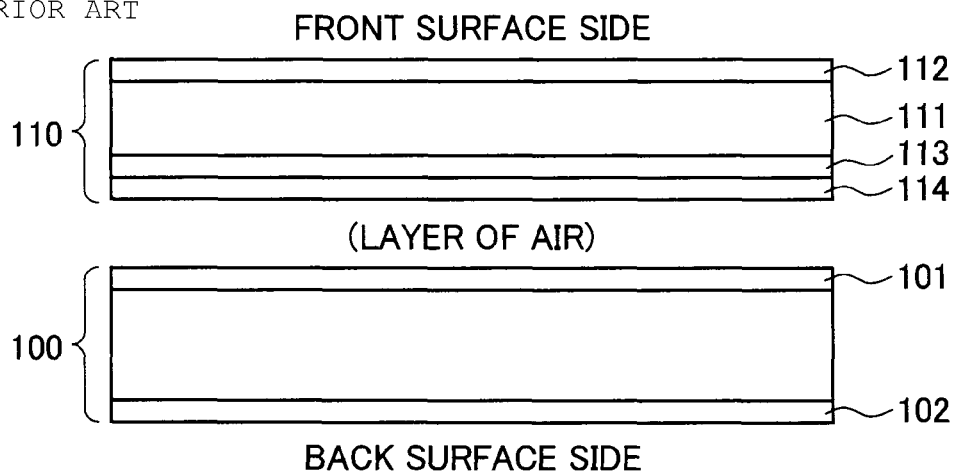
FIG. 2 is a cross-section view illustrating a structural example of a conventional liquid crystal display device.

The liquid crystal module 10 includes both the polarization plates 11 and 12 for display control but no λ/4 plate is provided between the liquid crystal layer and the polarization plate 11 on the side from which the display light goes out. Therefore, the visual characteristics of the liquid crystal display device are not affected by those of the λ/4 plate, and so a decline in the visual characteristics is prevented, unlike the conventional art shown in FIG. 2.

The display light passed through the polarization plate 11, provided on the side of the liquid crystal module 10 from which side the display light goes out, is the linearly polarized light that has been subjected to a display control. This display light passes through the polarization plate 22 before it is viewed by a viewer. Therefore, it is necessary to reduce the loss of amount of the light while the display light passes through the polarization plate 22. The λ/4 plate 13 in the liquid crystal module 10 is provided to minimize the above light loss.

The display light (linearly polarized light) passed through the polarization plate 11 is converted into circularly polarized light by the λ/4 plate 13, goes through the layer of air and the touch panel 21 as it is, and then is converted into linearly polarized light again by the λ/4 plate 23. When the polarization axis of the display light (linearly polarized light) passing through the λ/4 plate 23 is in parallel to the transmission axis of the polarization plate 22, the loss of amount of light caused by polarization plate 22 becomes zero in theory. When the condition (A) or (B) is fulfilled, the polarization axis of the display light (linearly polarized light) passing through the λ/4 plate 23 becomes in parallel to the transmission axis of the polarization plate 22.

As explained above, in the liquid crystal display device of the present preferred embodiment, it is possible to reduce the loss of amount of light caused by the polarization plate 22, by arranging the λ/4 plate 13 in the liquid crystal module 10. In addition, the λ/4 plate 13 does not disturb the anti-reflective function of the polarization plate 22 since the λ/4 plate 13 is provided not in the touch panel section 20 but in the liquid crystal module 10. Therefore, unlike the conventional art shown in FIG. 3, it is not necessary that the anti-reflection film is provided on the back surface side of the touch panel unit or on the front side of the liquid crystal module. This makes it possible to avoid the problems of making the steps complicated and increasing the cost, which problems are derived from manufacturing of the anti-reflection film.

Figure 3:
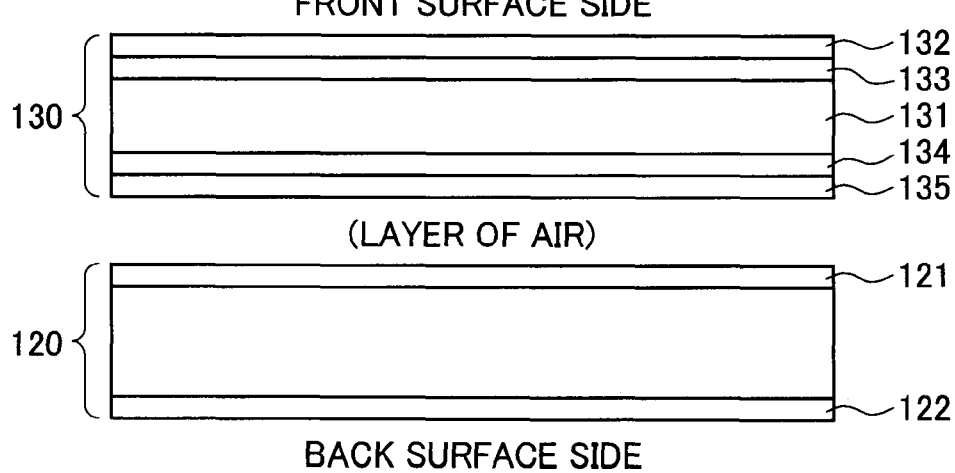
FIG. 3 is a cross-section view illustrating another structural example of a conventional liquid crystal display device.

In the conventional art shown in FIG. 3, the anti-reflection film is used to block the externally entered light reflected from the interface between (i) the touch panel section or the liquid crystal module and (ii) the layer of air because the externally entered light is not blocked by the polarization plate and the λ/4 plate. On the contrary, in the present preferred embodiment, the combination of the polarization plate and the λ/4 plate, each of which has stronger anti-reflective capability than the anti-reflection film, is used to block the externally entered light reflected from the interface between (i) the touch panel section or the liquid crystal module and (ii) the layer of air. As a result, higher anti-reflection function is obtainable.

In the above explanation, the touch panel section 20 is exemplified as a functional member provided on the front surface side of the liquid crystal module but a protection panel including a protection plate may be used instead of the touch panel section 20 as a functional member in the present invention. Specifically, a protection panel, including the polarization plate 22 and the λ/4 plate 23 provided on the front surface of the protection plate, may be provided, as a functional member, on the front surface side of the liquid crystal module.

Further, a smoke shield, for example, may be used instead of the transparent protection plate in the protection panel. In the protection panel using the smoke shield as the protection plate, it is possible to arrange a plurality of display sections, each of which is an individual unit, so that the seams of the units are not noticeable. As such, it appears that the protection panel using the smoke shield as the protection plate is suitably used for an instrument panel of a car, or the like. As compared to a transparent protection plate, a smoke shield tends to have internal scatterings of the light, which are not blocked by an anti-reflection film. In this case, it is possible to suitably use an arrangement of the present invention in which a polarization plate and a λ/4 plate provided on the front surface side of the protection panel.

As stated above, a liquid crystal display device according to a preferred embodiment of the present invention includes a liquid crystal module and a functional member provided in front of the liquid crystal module and arranged so that a space is left therebetween. A feature of the liquid crystal display device resides in that (i) a λ/4 plate is provided in front of the liquid crystal module and (ii) a polarization plate and a λ/4 plate are provided in front of the functional member in this order from the front surface side.

According to this unique arrangement, since the polarization plate and the λ/4 plate are provided on the side of the functional member, it is possible to block not only the externally entered light reflected from inside of the functional member but also the externally entered light reflected from an interface between (i) the functional member or the liquid crystal module and (ii) the layer of air. Therefore, it is not necessary that the anti-reflection film be provided on the back surface side of the functional member and/or on the front surface side of the liquid crystal module. As a result, the problems of making the steps complicated and increasing the cost, which problems are derived from manufacturing of the anti-reflection film(s), are eliminated.

Also, according to this unique arrangement, since a combination of the polarization plate and the λ/4 plate, each of which has a stronger anti-reflective capability than an anti-reflection film, is used, it is also possible with higher effectiveness to avoid the situation that the externally entered light is reflected from the interface between (i) the functional member or the liquid crystal module and (ii) the layer of air.

Further, the λ/4 plate provided in front of the liquid crystal module reduces the loss of the display light passing through the polarization plate provided on the side of the functional member.

Also, in the liquid crystal display device according to preferred embodiments of the present invention, the functional member is suitably used in the following arrangements, (i) the polarization plate and the λ/4 plate are provided on the front surface side of the touch panel in this order from the front surface side or (ii) the polarization plate and the λ/4 plate are provided on the front surface side of the smoke shield in this order from the front surface side.

Namely, compared with the transparent protection plate, for example, the touch panel and the smoke shield tend to have more external light reflections because they are members that tend to have internal light scatterings. Therefore, the above arrangement is effective because the polarization plate 132 and the λ/4 plate 133, which have strong anti-reflective capability, are provided on a front surface side of the functional member to prevent the externally entered light from being reflected.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A liquid crystal display device comprising:
   a liquid crystal module;
   a functional member provided on a front surface side of the liquid crystal module and arranged such that a space is provided between the functional member and the liquid crystal module;
   a first polarization plate and a first λ/4 plate provided on a front surface side of the liquid crystal module in this order from the front surface side;
   a second polarization plate and a second λ/4 plate provided on a front surface side of the functional member in this order from the front surface side; and
   a λ/2 plate provided between the first polarization plate and the first λ/4 plate; wherein
   the first polarization plate, the first λ/4 plate, the second polarization plate, and the second λ/4 plate are arranged such that none of the following conditions are met:
   (A) the first λ/4 plate and the second λ/4 plate have a same retardation and have lag axes that are perpendicular or substantially perpendicular to each other, and the first polarization plate and the second polarization plate have transmission axes that are parallel or substantially parallel to each other;
   (B) the first λ/4 plate and the second λ/4 plate have a same retardation and have lag axes that are parallel or substantially parallel to each other, and the first polarization plate and the second polarization plate have transmission axes that are perpendicular or substantially perpendicular to each other; and
   (C) a condition that corresponds to either (A) or (B), and the lag axis of the first λ/4 plate and the transmission axis of the second polarization plate are rotated by a same degree in a same direction.

2. The liquid crystal device in claim 1, wherein the functional member is arranged so that the second polarization plate and the second λ/4 plate are provided on a front surface side of a touch panel in this order from the front surface side.

3. The liquid crystal device in claim 1, wherein the functional member is arranged so that the second polarization plate and the second λ/4 plate are provided on a front surface side of a smoke shield in this order from the front surface side.

* * * * *